US011128514B2

(12) United States Patent
Saito et al.

(10) Patent No.: US 11,128,514 B2
(45) Date of Patent: Sep. 21, 2021

(54) TERMINAL AND BASE STATION APPARATUS FOR ARRANGING AND RECEIVING A PHASE TRACKING REFERENCE SIGNAL

(71) Applicant: NTT DOCOMO, INC., Tokyo (JP)

(72) Inventors: Keisuke Saito, Tokyo (JP); Kazuaki Takeda, Tokyo (JP); Satoshi Nagata, Tokyo (JP); Yuichi Kakishima, Palo Alto, CA (US)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 16/649,102

(22) PCT Filed: Sep. 25, 2017

(86) PCT No.: PCT/JP2017/034508
§ 371 (c)(1),
(2) Date: Mar. 19, 2020

(87) PCT Pub. No.: WO2019/058548
PCT Pub. Date: Mar. 28, 2019

(65) Prior Publication Data
US 2020/0228384 A1    Jul. 16, 2020

(51) Int. Cl.
*H04L 27/26* (2006.01)
*H04L 5/00* (2006.01)
*H04W 72/04* (2009.01)

(52) U.S. Cl.
CPC ........ *H04L 27/2675* (2013.01); *H04L 5/0051* (2013.01); *H04L 27/2613* (2013.01); *H04L 27/2657* (2013.01); *H04W 72/04* (2013.01)

(58) Field of Classification Search
CPC ............... H04L 27/261; H04L 27/2613; H04L 27/2657; H04L 27/2675; H04L 5/0051; H04L 5/0094; H04L 5/0053; H04W 72/04
USPC .................................................. 370/310, 329
See application file for complete search history.

(56) References Cited

U.S. PATENT DOCUMENTS

2019/0273544 A1*  9/2019  Cha ........................ H04L 1/0026
2020/0162228 A1*  5/2020  Gao ........................ H04L 5/0051

FOREIGN PATENT DOCUMENTS

WO        2017/138880 A1      8/2017

OTHER PUBLICATIONS

International Search Report issued in PCT/JP2017/034508 dated Dec. 12, 2017 (5 pages).
Written Opinion of the International Searching Authority issued in PCT/JP2017/034508 dated Dec. 12, 2017 (4 pages).

(Continued)

*Primary Examiner* — Melvin C Marcelo
*Assistant Examiner* — Natali Pascual Peguero
(74) *Attorney, Agent, or Firm* — Osha Bergman Watanabe & Burton LLP (57) ABSTRACT

A terminal includes a processor that arranges a demodulation reference signal (DMRS) in a first resource, and arranges a phase tracking reference signal (PTRS) in an interval of a number of symbols in a second resource with a symbol of the DMRS as a starting point, and a transmitter that transmits, to a base station apparatus, the DMRS and the PTRS that are arranged in the first resource and the second resource, respectively.

10 Claims, 8 Drawing Sheets

(56) References Cited

OTHER PUBLICATIONS

Ericsson; "On DL and UL phase noise tracking RS (PTRS)"; 3GPP TSG-RAN WG1 #87ah-NR, R1-1701161; Spokane, WA, USA; Jan. 16-20, 2017 (10 pages).
Qualcomm; "WF on Remaining issues on DMRS"; 3GPP TSG RAN WG1 Meeting #90, R1-1715261; Prague, Czech Republic; Aug. 21-25, 2017 (14 pages).
Ericsson; "Summary of PTRS way forwards and offline discussions"; 3GPP TSG-RAN WG1 #90, R1-1715205; Prague, Czech Republic; Aug. 21-25, 2017 (4 pages).
Extended European Search Report issued in counterpart European Patent Application No. 17925955.1, dated Mar. 19, 2021 (12 pages).
Intel Corporation; "Remaining Details on PT-RS"; 3GPP TSG RAN WG1 Meeting NR#3, R1-1716301; Nagoya, Japan; Sep. 18-21, 2017 (10 pages).
Notice of Reasons for Refusal issued in Japanese Application No. 2019-542948, dated Apr. 20, 2021 (17 pages).
Office Action issued in the counterpart Canadian Patent Application No. 3076475, dated May 10, 2021 (7 pages).

\* cited by examiner

TERMINAL AND BASE STATION APPARATUS FOR ARRANGING AND RECEIVING A PHASE TRACKING REFERENCE SIGNAL

TECHNICAL FIELD

The present invention relates to a base station apparatus and user equipment of a radio communication system.

BACKGROUND ART

In 3rd Generation Partnership Project (3GPP), a study of a radio communication scheme (the radio communication scheme is referred to as "NR," hereinafter) called 5G or New Radio (NR) has been progressing to achieve a further increase in the system capacity, a further increase in the data transmission rate, and a further reduction in the latency in the radio section, etc. In NR, in order to meet the requirements to achieve a throughput of greater than or equal to 10 Gbps, while suppressing the latency in the radio section to be less than or equal to 1 ms, various radio techniques have been studied.

In NR, with respect to the demodulation reference signal (DMRS: Demodulation Reference Signal), in order to reduce a processing time required for channel estimation and signal demodulation, the study has been progressing to locate the demodulation reference signal in a front part in a time domain within a slot. The demodulation reference signal located in the front part is referred to as Front-loaded DMRS (e.g., Non-Patent Document 1).

Additionally, in NR, introduction of a Phase Tracking Reference Signal (PTRS) has been studied (e.g., Non-Patent Document 2), which is a reference signal for phase fluctuation correction for reducing an effect of phase noise, etc.

PRIOR ART DOCUMENT

Non-Patent Document

Non-Patent Document 1: R1-1715261 WF on Remaining issues on DMRS, 3GPP TSG RAN WG1 Meeting #90 (Prague, Czech Republic, 21st-25th August, 2017)

Non-Patent Document 2: R1-1715205 Summary of PTRS way forwards and offline discussions, 3GPP TSG RAN WG1 Meeting #90 (Prague, Czech Republic, 21st-25th August, 2017)

SUMMARY OF THE INVENTION

Problem to be Solved by the Invention

In NR, considering overlap with another reference signal and an overhead of all the reference signals, the PTRS is required to be appropriately located on a radio frame, while ensuring the required quality.

The present invention has been achieved in view of the above-described point, and an object is to enhance accuracy of a correction of phase noise by appropriately locating the PTRS in a radio communication system.

Means for Solving the Problem

According to the disclosed technology, there is provided a base station apparatus for communicating with user equipment, the base station apparatus including a configurator that arranges a reference signal used for demodulation and a reference signal used for a phase correction in a radio frame; a transmitter that transmits the radio frame to the user equipment, wherein, in the radio frame, one of the reference signal used for the phase correction and the reference signal used for the demodulation is arranged within a predetermined interval.

Advantage of the Invention

According to the disclosed technology, the accuracy of the correction of the phase noise can be enhanced by appropriately arranging the PTRS in the radio communication system.

EMBODIMENTS OF THE INVENTION

In the following, embodiments of the present invention are described by referring to the drawings. The embodiments described below are merely examples, and embodiments to which the present invention is applied are not limited to the following embodiments.

In operations of radio communication systems according to the embodiments, the existing technology is appropriately used. The existing technology is, for example, the existing LTE. However, the existing technology is not limited to the existing LTE. Furthermore, the term "LTE" used in the present specification has a broad meaning including LTE-Advanced and a scheme (e.g., NR) that is as of LTE-Advanced, unless as otherwise specified.

Additionally, in the embodiments described below, the terms that are used for the existing LTE are used, such as Synchronization Signal (SS), Primary SS (PSS), Secondary SS (SSS), Physical broadcast channel (PBCH), Physical RACH (PRACH), Physical Downlink Control Channel (PDCCH), and Physical Downlink Shared Channel (PDSCH). However, these are for convenience of the description, and signals, functions, etc., that are equivalent to these may be called by other names. The above-described terms in NR correspond to NR-SS, NR-PSS, NR-PBCH, NR-PRACH, NR-PDCCH, NR-PDSCH, etc.

Figure 1:
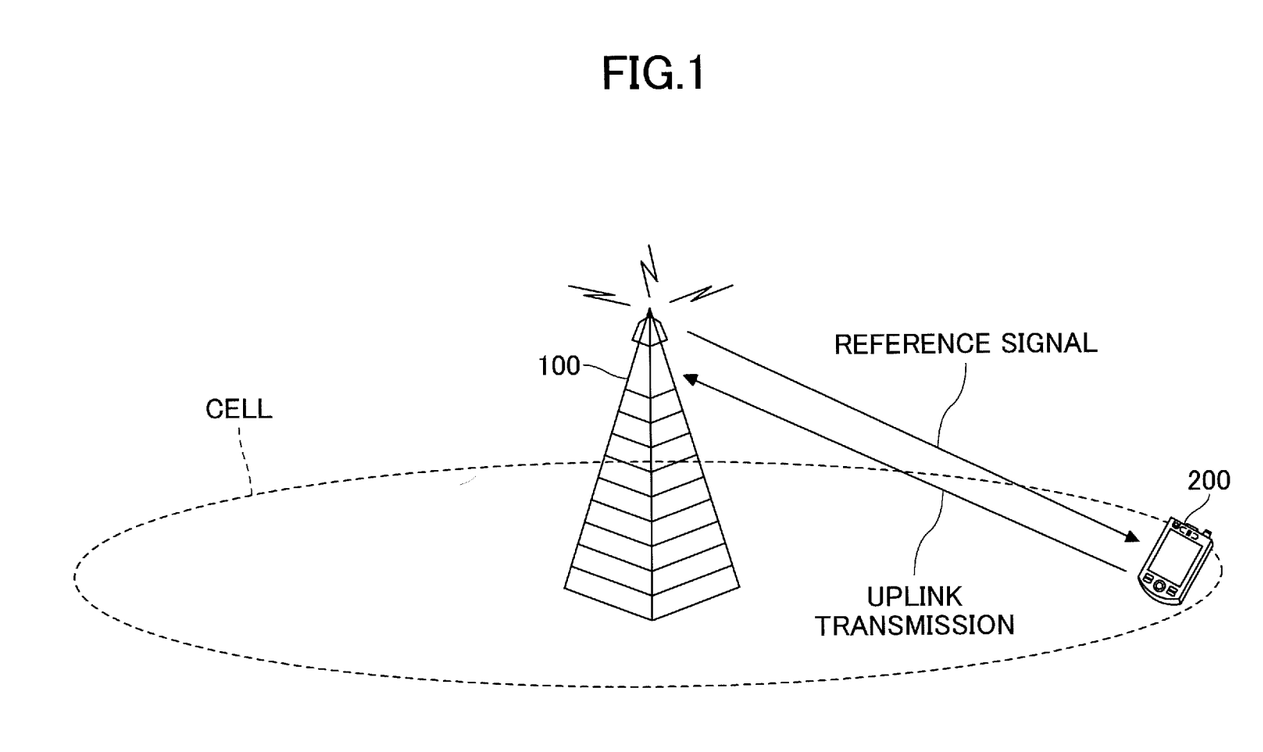
FIG. 1 is a diagram illustrating an example of a configuration of a radio communication system according to an embodiment of the present invention.

FIG. 1 is a diagram illustrating an example of a configuration of the radio communication system according to the embodiment of the present invention. As illustrated in FIG. 1, the radio communication system according to the embodiment of the present invention includes a base station apparatus 100 and user equipment 200. In FIG. 1, a single base station apparatus 100 and single user equipment 200 are illustrated. However, this is an example, and there may be more than one base station apparatus 100 and more than one unit of user equipment 200.

The base station apparatus 100 is a communication device that provides for one or more cells and that performs radio communication with the user equipment 200. As illustrated in FIG. 1, the base station apparatus 100 transmits a reference signal to the user equipment 200. The reference signal is arranged in a predetermined Orthogonal Frequency Division (OFDM) symbol on the radio frame in which a control signal and a data signal are arranged. The reference signal includes, for example, a Cell-specific Reference Signal (CRS), Demodulation Reference Signal (DMRS), Phase Tracking Reference Signal (PTRS), Channel State Information-Reference Signal (CSI-RS), etc. Each of the base station apparatus 100 and the user equipment 200 is capable of performing beamforming to transmit and receive signals. The user equipment 200 is a communication device including a radio communication function, such as a smartphone, a mobile phone, a tablet, a wearable terminal, and a communication module for Machine-to-Machine (M2M). The user equipment 200 wirelessly connects to the base station apparatus 100, and the user equipment 200 utilizes various types of communication services provided by the radio communication system. Based on the reference signal on the radio frame received from the base station apparatus 100, the user equipment 200 performs channel estimation for downlink and performs demodulation of a downlink signal.

As illustrated in FIG. 1, uplink transmission is performed from the user equipment 200 to the base station apparatus 100. The uplink transmission is executed, for example, through the NR-PUCCH (Physical uplink control channel) or the NR-PUSCH (Physical uplink shared channel). A control signal is transmitted through the NR-PUCCH and a data signal and/or a control signal is transmitted through the NR-PUSCH.

Note that, in the embodiment, a duplex (Duplex) scheme may be a Time Division Duplex (TDD) scheme, a Frequency Division Duplex (FDD) scheme, or any other scheme (e.g., Flexible Duplex).

In the following description, transmitting a signal using a transmitting beam may be the same as transmitting the signal that is multiplied by a precoding vector (precoded by the precoding vector). Similarly, receiving a signal using a receiving beam may be the same as multiplying the received signal by a predetermined weight vector. Furthermore, transmitting a signal using a transmitting beam may be expressed as transmitting the signal with a specific antenna port. Similarly, receiving a signal using a receiving beam may be expressed as receiving the signal with a specific antenna port. The antenna port refers to the logical antenna port or the physical antenna port that is defined in the 3GPP standard. Note that the method of forming the transmitting beam and the receiving beam is not limited to the above-described method. For example, in each of the base station apparatus 100 provided with a plurality of antennas and user equipment 200 provided with a plurality of antennas, a method may be used such that angles of the antennas are changed; a method may be used in which the method of using the precoding vector and the method of changing the antenna angles are combined; different antenna panels may be switched to be used; a method may be used in which methods for combining a plurality of antenna panels to be used are combined; and any other method may be used. Additionally, for example, in a high frequency band, a plurality of mutually different transmitting beams may be used. Using a plurality of transmitting beams is referred to as a multi-beam operation, and using a single transmitting beam is referred to as a single beam operation.

Embodiment

An embodiment is described below.

Figure 2:
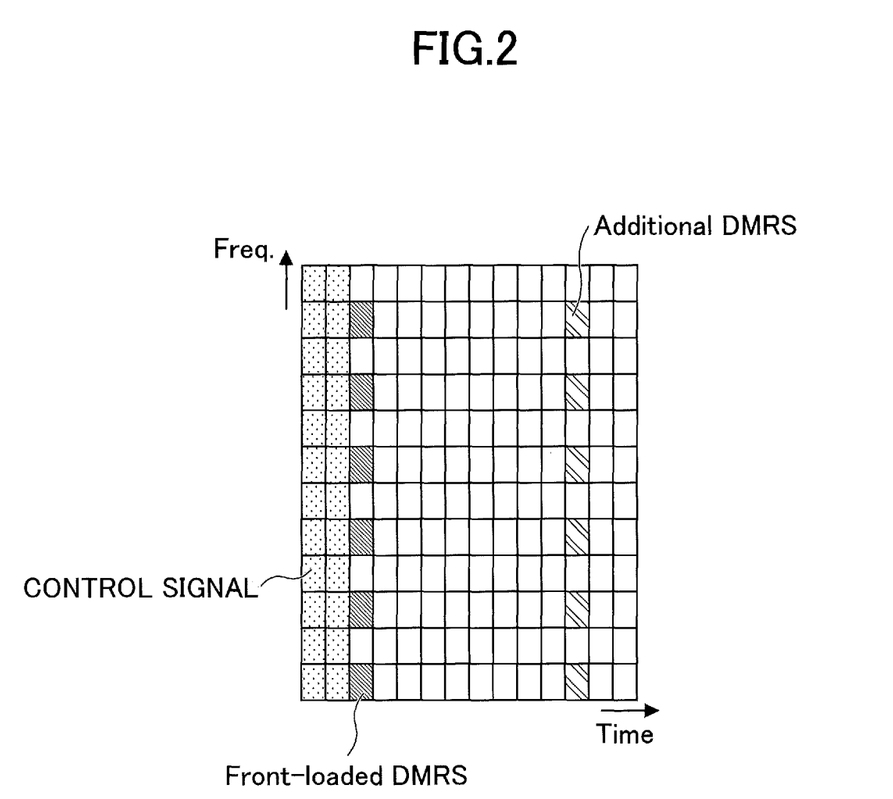
FIG. 2 is a diagram illustrating an example (1) of an arrangement in which a control signal and a DMRS are arranged in a radio frame in an embodiment of the present invention.

FIG. 2 is a diagram illustrating an example (1) of an arrangement in which a control signal and a DMRS are arranged in a radio frame, in the embodiment of the present invention. FIG. 2 illustrates one slot that is formed of fourteen OFDM symbols. In the example of the arrangement illustrated in FIG. 2, the control signal is arranged in the first two symbols.

In NR, supporting a wide range of frequencies from a low carrier frequency to a high carrier frequency, while meeting various requirements, has been studied. In order to reduce a processing time required for channel estimation and demodulation of a received signal, a DMRS, which is a demodulation reference signal, is arranged at the third symbol from the start of the slot. Namely, the DMRS is arranged at a front part of the slot in the time domain. A DMRS arranged at the front part is referred to as a Front-loaded DMRS.

The NR is required to support the user equipment 200 moving at high speed. Accordingly, as illustrated in FIG. 2, a correction of a Doppler shift has been studied by inserting the DMRS into a rear part of the slot, e.g., into the twelfth symbol. A DMRS additionally arranged in a slot in the time domain is referred to as an Additional DMRS.

Figure 3:
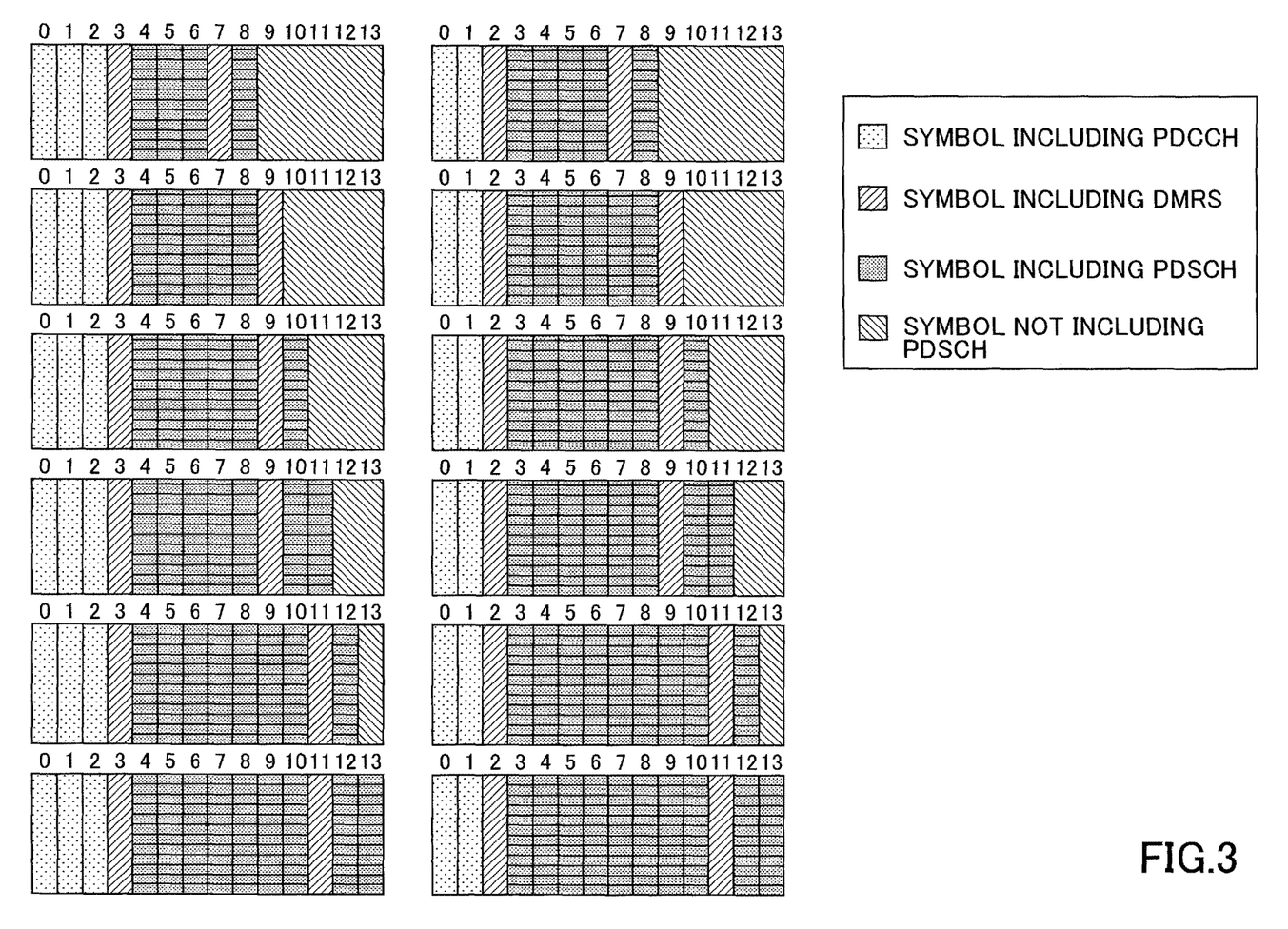
FIG. 3 is a diagram illustrating an example (2) of an arrangement in which the control signal and the DMRS are arranged in the radio frame in an embodiment of the present invention.
Figure 13:
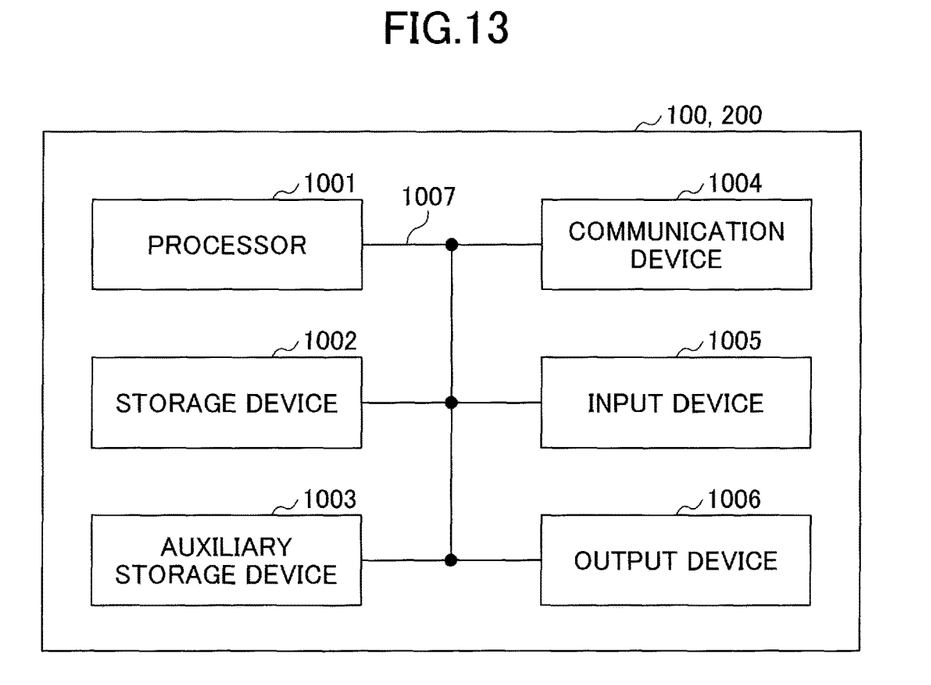
FIG. 13 is a diagram illustrating an example of a hardware configuration of each of the base station apparatus 100 and the user equipment 200 according to an embodiment of the present invention.

FIG. 3 is a diagram illustrating an example (2) of an arrangement in which a control signal and a DMRS are arranged in a radio frame, according to the embodiment of the present invention. A scheme of mapping a DMRS onto an OFDM symbol is described for NR. The slots illustrated in FIG. 13 show the mapping of channels onto the fourteen symbols. A resource within a symbol is partitioned on a subcarrier-by-subcarrier basis, and the resource within the symbol is formed of twelve subcarriers.

In each slot illustrated in FIG. 3, the PDCCH is arranged at the front three symbols or the front two symbols of the slot. Additionally, the PDSCH is arranged at a symbol that is either the same as or subsequent to a symbol of the PDCCH. However, as illustrated in FIG. 3, there are slot configurations such that there is a symbol that does not include a PDSCH, at an 11th symbol, at a 12th symbol, at a 13th symbol, or 14th symbol from the start of the slot.

In each of the slots shown in FIG. 3, the DMRS arranged at the front part is the Front-loaded DMRS, and the DMRS arranged at the rear part is the Additional DMRS. The Front-loaded DMRS is arranged at the third symbol or the fourth symbol from the start of the slot. The Additional DMRS is arranged at the eighth symbol, the tenth symbol, or the twelfth symbol from the start of the slot.

As described above, the Front-loaded DMRS is arranged in one symbol, and the Additional DMRS is arranged in one symbol. Additionally, a plurality of other Additional DMRSs may be arranged in the slot, to be added at one symbol each.

Additionally, the Front-loaded DMRS may be arranged, for example, in two symbols, which are the third symbol and the fourth symbol from the start of the slot. Similarly, the Additional DMRS may be arranged, for example, in two symbols, which are the tenth symbol and the eleventh symbol from the start of the slot.

Figure 4:
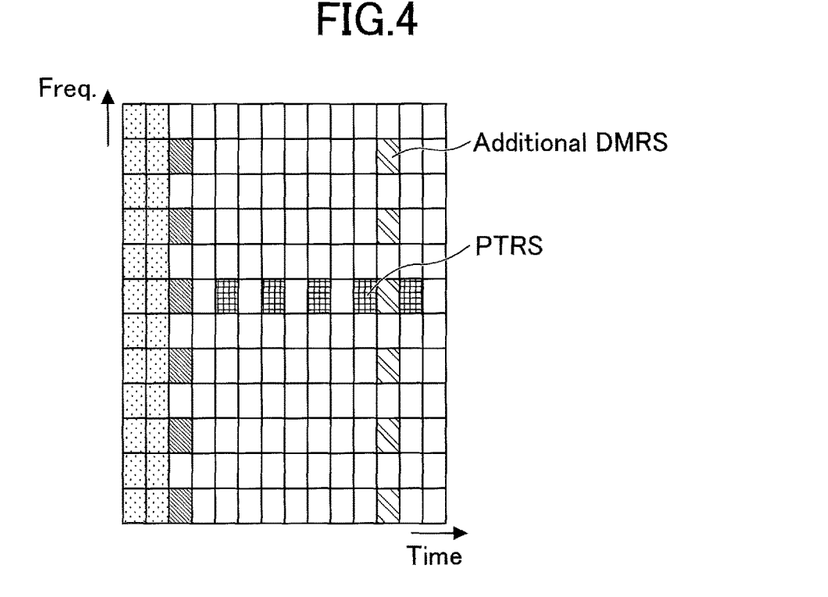
FIG. 4 is a diagram illustrating an example in which a PTRS is arranged in the radio frame in an embodiment of the present invention.

FIG. 4 is a diagram illustrating an example in which the PTRS is arranged in a radio frame, in the embodiment of the present invention. In FIG. 4, one slot that is formed of fourteen OFDM symbols is illustrated. In the example of the arrangement illustrated in FIG. 4, a control signal is arranged in the front two symbols, and the Front-loaded DMRS is arranged every second subcarrier at the third symbol from the start. Furthermore, the Additional DMRS is arranged every second subcarrier at the twelfth symbol from the start.

In FIG. 4, the PTRS is arranged every second symbol from the fifth symbol from the start to the thirteenth symbol from the start. Namely, the required insertion interval of an RS that can be applied for phase noise correction is assumed to be every other symbol.

Here, a PTRS is associated with one of DMRS ports. Namely, the same precoding is performed for a PRTS and the corresponding DMRS. Accordingly, if PTRSs and an Additional DMRS are mapped within the same slot, the insertion interval of RSs that can be applied for a correction of phase noise, namely, the insertion interval with respect to both the PTRS and the DMRS becomes dense compared to the required insertion interval, so that the overhead is increased, resulting in a decrease in throughput.

As illustrated in FIG. 4, since a PTRS is arranged at the eleventh symbol from the start, the DMRS is arranged at the twelfth symbol from the start, and a PTRS is arranged at the thirteenth symbol from the start, consecutively, the RSs are densely inserted compared to the required insertion interval, which is of every other symbol.

Figure 5:
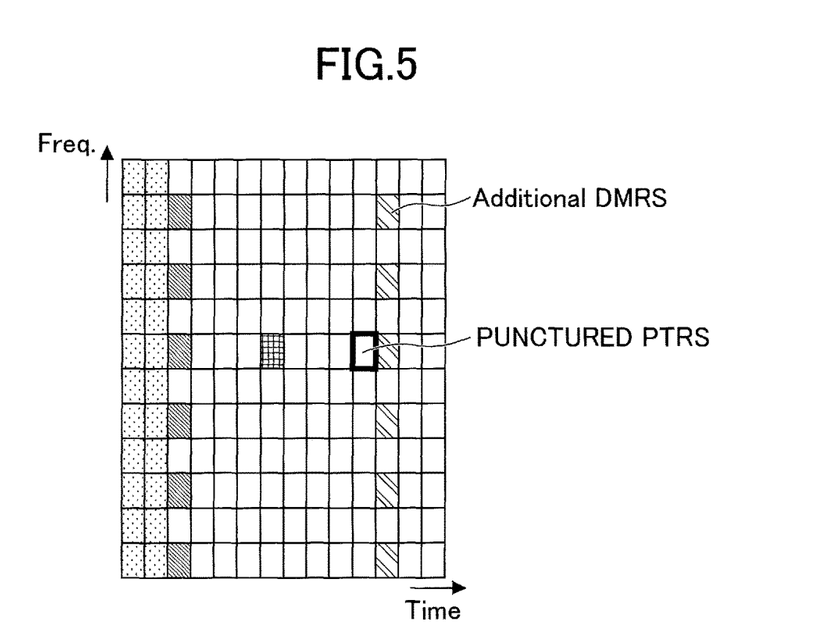
FIG. 5 is a diagram illustrating an example (1) in which the PTRS is arranged in the radio frame, while being punctured, in an embodiment of the present invention.

FIG. 5 is a diagram illustrating an example (1) in which a PTRS is arranged in a radio frame, while being punctured, in the embodiment of the present invention. In FIG. 5, one slot is illustrated, which is formed of fourteen OFDM symbols. In the example of the arrangement illustrated in FIG. 5, a control signal is arranged in the front two symbols, and a Front-loaded DMRS is arranged every second subcarrier at the third symbol from the start. Furthermore, an Additional DMRS is arranged every second subcarrier at the twelfth symbol from the start. In FIG. 5, a case is described in which the required insertion intervals of the PTRS is every four symbols.

As illustrated in FIG. 5, the PTRS is arranged at the seventh symbol from the start. Since the Front-loaded DMRS is arranged at the third symbol from the start, a position of a symbol into which the PTRS at the front is inserted may be defined to be the seventh symbol, which is obtained by adding four symbols, which is the insertion interval, to the symbol at which the Front-loaded DMRS is arranged. Here, the PTRS arranged at the eleventh symbol is punctured. For example, if the required insertion interval of the PTRS is every N symbols, the PTRS is punctured so that the insertion interval of the RSs including the PTRS and the Additional DMRS becomes every N+X symbols. Namely, in the example illustrated in FIG. 5, the insertion interval is defined to be every 4+1=5 symbols, where N=4 and X=1. The value of X may be defined in advance, or may be transmitted by signaling. If the value of X is defined in advance, signaling can be reduced. If the value of X is transmitted by signaling, insertion intervals can be flexibly configured. Additionally, a value of X may vary depending on a value of N. For example, if N=2, X may be one, and if N=4, X may be two.

As described above, overhead of the RSs can be reduced while maintaining intervals to be close to the required insertion intervals by puncturing of the PTRS depending on the required insertion intervals and the arrangements of the PTRS and the Additional DMRS.

Figure 6:
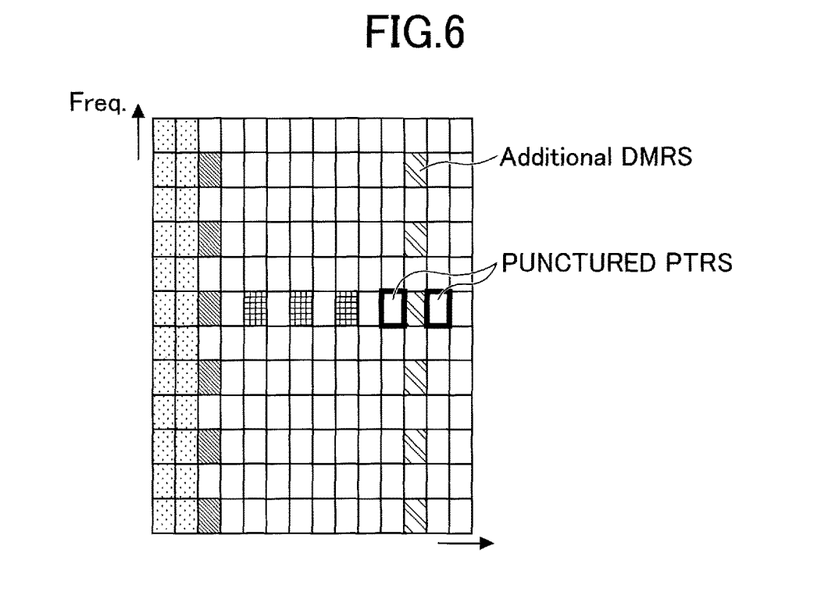
FIG. 6 is a diagram illustrating an example (2) in which the PTRS is arranged in the radio frame, while being punctured, in an embodiment of the present invention.

FIG. 6 is a diagram illustrating an example (2) in which a PTRS is arranged in a radio frame while being punctured, in the embodiment of the present invention. FIG. 6 illustrates one slot, which is formed of fourteen OFDM symbols. In the example of the arrangement illustrated in FIG. 6, a control signal is arranged in the front two symbols, and a Front-loaded DMRS is arranged every second subcarrier at the third symbol from the start. Furthermore, an Additional DMRS is arranged every second subcarrier at the twelfth symbol from the start. In FIG. 6, a case is described in which the required insertion interval of the PTRS is every other symbol.

As illustrated in FIG. 6, the PTRS is arranged at the fifth symbol from the start. The PTRS arranged at the eleventh symbol and at the thirteenth symbol are punctured. Here, the method described by referring to FIG. 5 is applied, such that, if the required insertion interval of the PTRS is every N symbols, the insertion interval of the RSs including the PTRS and the Additional DMRS is an interval of every N+X symbols. By setting N=2 and X=1, the PTRS is punctured, so that the insertion interval is every 2+1=3 symbols. For example, the insertion interval of the RS at symbols as of the RS based on the modified insertion interval may be changed again to be the required insertion interval, which is every other symbol, or may be maintained to be the modified insertion interval, which is every third symbol. The method of modifying the required insertion interval to be every other symbol again is described below. Similar to FIG. 5, the value of X may be defined in advance, or may be transmitted by signaling.

Figure 7:
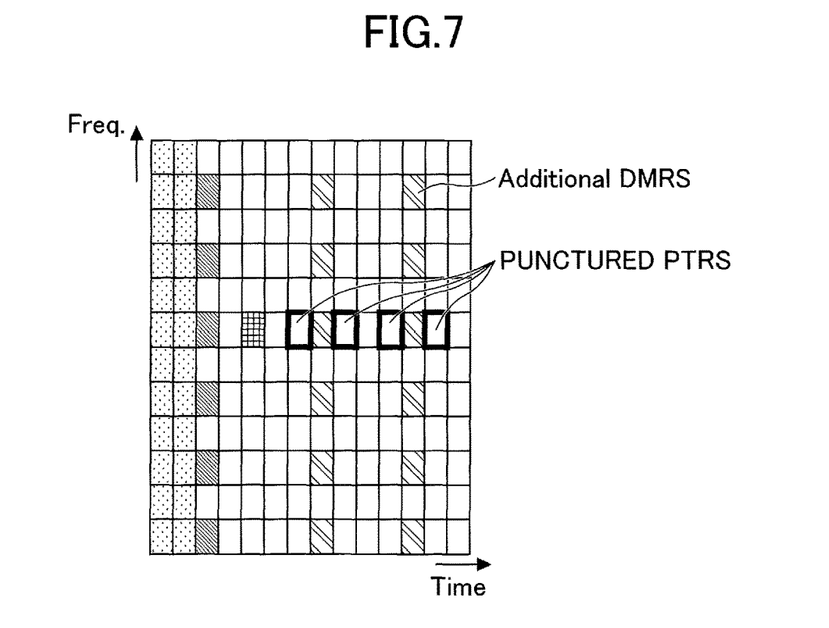
FIG. 7 is a diagram illustrating an example (3) in which the PTRS is arranged in the radio frame, while being punctured, in an embodiment of the present invention.

FIG. 7 is a diagram illustrating an example (3) in which a PTRS is arranged in a radio frame while being punctured, in the embodiment of the present invention. FIG. 7 illustrates one slot, which is formed of fourteen OFDM symbols. In the example of the arrangement illustrated in FIG. 7, a control signal is arranged in the front two symbols, and a Front-loaded DMRS is arranged at every second subcarrier at the third symbol from the start. Furthermore, two sets of Additional DMRSs are arranged, and the Additional DMRSs are arranged every second subcarrier at the eighth symbol and at the twelfth symbol from the start. In FIG. 7, a case is described in which the required insertion interval of the PTRS is every other symbol.

As illustrated in FIG. 7, the PTRS is arranged at the fifth symbol from the start. The PTRS that is arranged at the seventh symbol, the PTRS that is arranged at the ninth symbol, the PTRS that is arranged at the eleventh symbol, and the PTRS that is arranged at the thirteenth symbol are punctured. Here, the method described by referring to FIG. 5 is applied, such that, if the required insertion interval of the PTRS is every N symbols, the insertion interval of the RSs including the PTRS and the Additional DMRS is an interval of every N+X symbols. By setting N=2 and X=2, the PTRS is punctured, so that the insertion interval is every 2+2=4 symbols. Note that, if the PTRS is punctured by setting N=2 and X=1, so that the insertion interval is every 2+1=3 symbols, the PTRS arranged at the eleventh symbol is not punctured (not depicted). Similar to FIG. 5, the value of X may be defined in advance, or may be transmitted by signaling.

Figure 8:
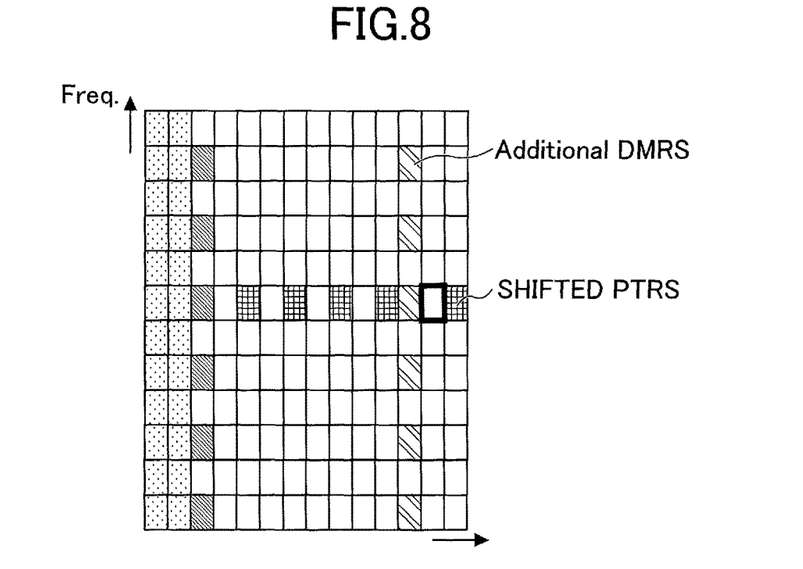
FIG. 8 is a diagram illustrating an example (1) in which the PTRS is arranged in the radio frame, while being shifted, in an embodiment of the present invention.

FIG. 8 is a diagram illustrating an example (1) in which a PTRS is arranged in a radio frame while being shifted, in the embodiment of the present invention. FIG. 8 illustrates one slot, which is formed of fourteen OFDM symbols. In the example of the arrangement illustrated in FIG. 8, a control signal is arranged in the front two symbols, and a Front-loaded DMRS is arranged at every second subcarrier at the third symbol from the start. Furthermore, an Additional DMRS is arranged every second subcarrier at the twelfth symbol from the start. In FIG. 8, a case is described in which the required insertion interval of the PTRS is every other symbol.

As illustrated in FIG. 8, the PTRS is arranged at the fifth symbol from the start, and, subsequently, the PTRS is inserted every other symbol. Here, the PTRS is shifted, so that insertion interval at symbols as of the twelfth symbol at which the Additional DMRS is arranged becomes the required insertion interval again. Namely, in FIG. 8, the PTRS to be inserted into the thirteenth symbol from the start is shifted later by one symbol, and the PTRS is inserted into the fourteenth symbol. By the shift, at symbols as of the symbol at which the Additional DMRS is arranged, the PTRS is inserted every other symbol.

Figure 9:
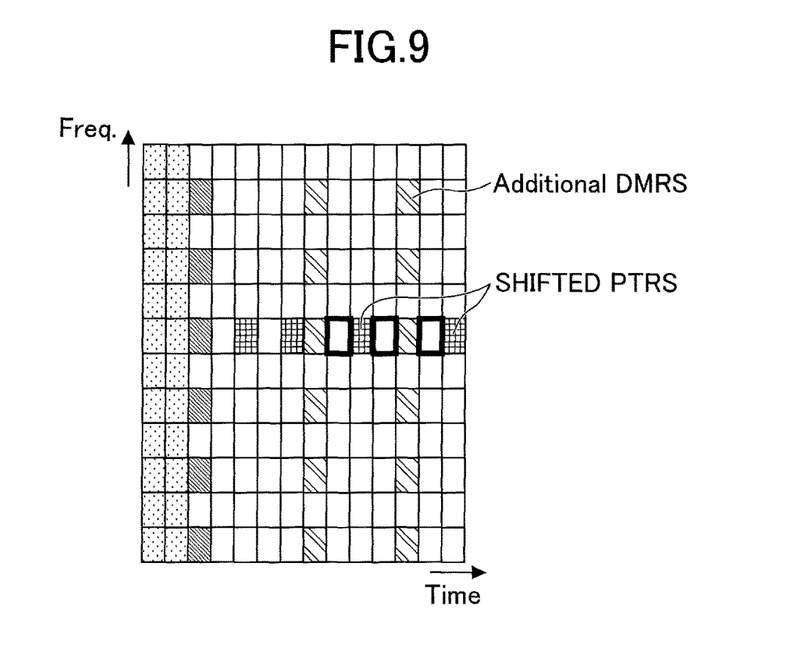
FIG. 9 is a diagram illustrating an example (2) in which the PTRS is arranged in the radio frame, while being shifted, in an embodiment of the present invention.

FIG. 9 is a diagram illustrating an example (2) in which a PTRS is arranged in a radio frame while being shifted, in the embodiment of the present invention. FIG. 9 illustrates one slot, which is formed of fourteen OFDM symbols. In the example of the arrangement illustrated in FIG. 9, a control signal is arranged in the front two symbols, and a Front-loaded DMRS is arranged at every second subcarrier at the third symbol from the start. Furthermore, two sets of Additional DMRSs are arranged, and the Additional DMRSs are arranged every second subcarrier at the twelfth symbol from the start. In FIG. 9, a case is described in which the required insertion interval of the PTRS is every other symbol.

As illustrated in FIG. 9, the PTRS is arranged at the fifth symbol from the start, and, subsequently, the PTRS is inserted every two symbols. Here, the PTRS is shifted, so that, at symbols as of the eighth symbol at which the Additional DMRS is arranged, the insertion interval becomes the required insertion interval again. Namely, in FIG. 9, the PTRS to be inserted into the ninth symbol from the start, the PTRS to be inserted into the eleventh symbol from the start, and the PTRS to be inserted into the thirteenth symbol from the start are shifted later by one symbol, and the PTRS is inserted into the tenth symbol and the fourteenth symbol. At the twelfth symbol from the start, the Additional DMRS is arranged, so that the PTRS is not required to be shifted to be inserted. By the shift, at symbols as of the symbol at which the Additional DMRS is arranged, the PTRS is inserted every other symbol.

Figure 10:
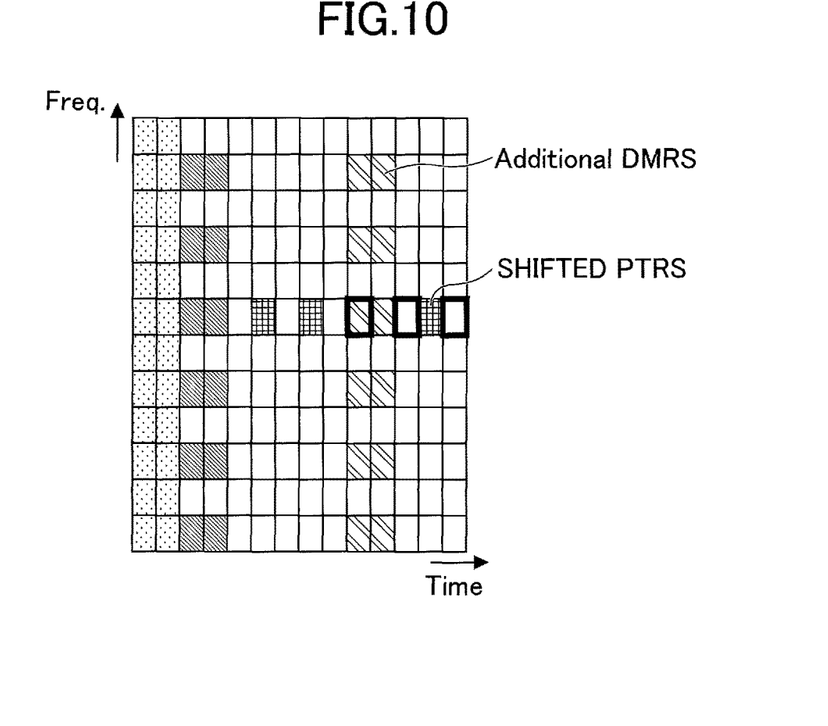
FIG. 10 is a diagram illustrating an example (3) in which the PTRS is arranged in the radio frame, while being shifted, in an embodiment of the present invention.

FIG. 10 is a diagram illustrating an example (3) in which a PTRS is arranged in a radio frame while being shifted, in the embodiment of the present invention. FIG. 10 illustrates one slot, which is formed of fourteen OFDM symbols. In the example of the arrangement illustrated in FIG. 10, a control signal is arranged in the front two symbols, and a Front-loaded DMRS of the two-symbol duration is arranged at every second subcarrier at the third symbol and the fourth symbol from the start. Furthermore, an Additional DMRS of the two-symbol duration is arranged at every second subcarriers at the tenth symbol and the eleventh symbol from the start. Note that a number of symbols per one set of the Additional DMRS is the same as a number of symbols of the Front-loaded DMRS. In FIG. 10, a case is described in which the required insertion interval of the PTRS is every other symbol.

As illustrated in FIG. 10, the PTRS is arranged at the sixth symbol from the start, and, subsequently, the PTRS is inserted every other symbol. Here, the PTRS is shifted, so that, at symbols as of the eleventh symbol at which the Additional DMRS is arranged, the insertion interval becomes the required insertion interval again. Namely, in FIG. 10, the PTRS to be inserted into the twelfth symbol from the start is shifted later by one symbol, and the PTRS is inserted into the thirteenth symbol. The fourteenth symbol from the start is the last symbol in the slot, so that the PTRS is not required to be shifted to be inserted. By the shift, at symbols as of the symbol at which the Additional DMRS is arranged, the PTRS is inserted every other symbol.

By the above-described embodiment, a method of mapping a PTRS at suitable insertion intervals can be achieved. Additionally, the base station apparatus 100 and the user equipment 200 may adjust, by a predefined method, the insertion intervals of the PTRS to be transmitted. Additionally, the adjustment of the insertion intervals of the PTRS in the above-described embodiment may be similarly applied to downlink and uplink. Additionally, the base station apparatus 100 and the user equipment 200 may perform a reception process while assuming a received signal to which the adjustment of the insertion interval of the PTRS in the above-described embodiment is applied. As in the above-described embodiment, by implementing the mapping of the PTRS in which the insertion intervals are implicitly adjusted to be the required insertion intervals, accuracy of a correction of phase noise can be enhanced without increasing signaling overhead.

Furthermore, in the arrangement in which the PTRS is shifted as in the above-described embodiment, the intervals of inserting the PTRS become closer to equal intervals, so that smoothing of the accuracy of the correction of the phase noise can be achieved. Furthermore, by puncturing or shifting the PTRS as in the above-described embodiment, a method can be achieved such that the PTRS or the Additional DMRS is arranged in the radio frame within a predetermined interval.

Note that the methods described in the above-described embodiment may be combined and applied. For example, the PTRS inserted into a symbol located in front of the Additional DMRS in the time domain is punctured by the method described in the embodiment, and the PTRS that is to be inserted into a symbol located subsequent compared to the Additional DMRS in the time domain may be shifted by the method described in the embodiment.

Additionally, one of the methods described in the above-described embodiment may be explicitly set or transmitted by higher layer signaling, and the mapping of the PTRS may be specified by the method.

Note that the size of the PDCCH is not limited to two symbols. The size of the PDCCH may be zero symbols, one symbol, or three symbols; or the size of the PDCCH may be such that the PDCCH can be inserted in some subcarriers in a symbol.

Note that the location of inserting the Front-loaded DMRS is not limited to the third symbol. The location may be the fourth symbol, the front symbol of the PUSCH for an uplink signal, or the second symbol of the PUSCH. Furthermore, a number of symbols of a Front-loaded DMRS is not limited to one. The Front-loaded DMRS may be two symbols to be arranged at the third symbol and the fourth symbol; to be arranged at the fourth symbol and the fifth symbol; to be arranged at the front symbol and the second symbol of the PUSCH for an uplink signal; or to be arranged at the second symbol and the third symbol of the PUSCH. Similarly, the symbols arranged in the slot may be changed for the Additional DMRS.

Note that the DMRS may be referred to as a demodulation RS. As for the DMRS, only the Front-loaded DMRS may be arranged, or other additional DMRS may further be arranged in the slot. Note that the number of symbols in one slot is not limited to fourteen. Any value from one symbol to thirteen symbols may be used. A case other than fourteen symbols may be referred to as a mini-slot.

The downlink data channel may be referred to as PDSCH. The uplink data channel may be referred to as PUSCH. The downlink control channel may be referred to as PDCCH. The uplink control channel may be referred to as PUCCH.

In the above-described embodiment, the base station apparatus 100 and the user equipment 200 can reduce the overhead of the RS by arranging the PTRS while considering the arrangement of the Additional DMRS. Additionally, by implicitly achieving the mapping of the PTRS with the insertion intervals close to the required insertion intervals, the accuracy of the correction of the phase noise at the receiving device can be enhanced without increasing the signaling overhead. Furthermore, since the intervals of inserting the PTRS or the DMRS become closer to equal intervals, smoothing of the accuracy of the correction of the phase noise can be achieved.

Namely, by appropriately arranging the PTRS in the radio communication system, the accuracy of the correction of the phase noise can be enhanced.

Next, a functional configuration example of the base station apparatus 100 and a functional configuration example of the user equipment 200 for executing the above-described process and operation are described. Each of the base station apparatus 100 and the user equipment 200 includes at least a function for implementing the embodiments. However, each of the base station apparatus 100 and the user equipment 200 may include only a part of the functions in the embodiments.

Figure 11:
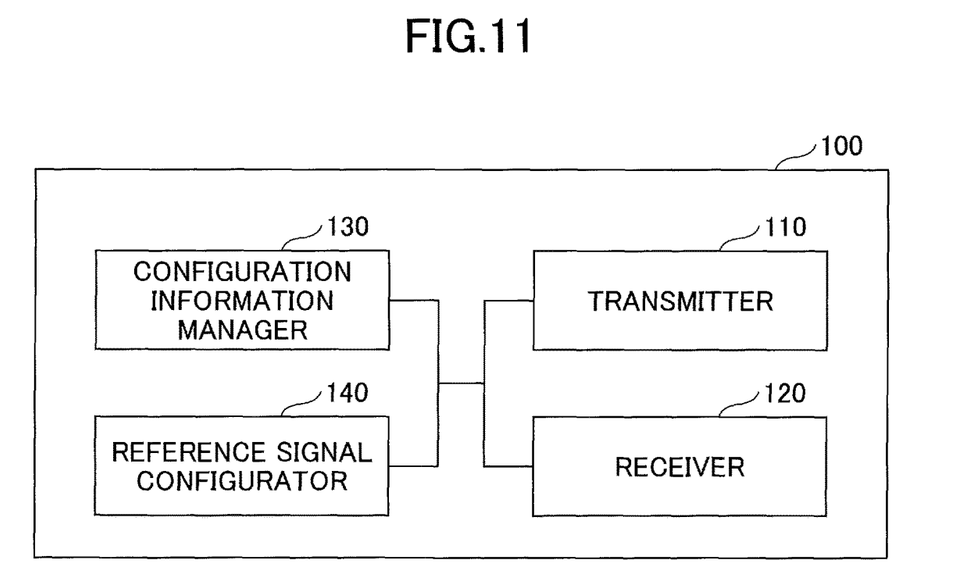
FIG. 11 is a diagram illustrating an example of a functional configuration of a base station apparatus 100 according to an embodiment of the present invention.

FIG. 11 is a diagram illustrating the example of the functional configuration of the base station apparatus 100. As illustrated in FIG. 11, the base station apparatus 100 includes a transmitter 110; a receiver 120; a configuration information manager 130; and a reference signal configurator 140. The functional configuration illustrated in FIG. 11 is merely an example. The functional division and the name of the functional unit may be any division and any name, provided that the operation according to the embodiment of the present invention can be executed.

The transmitter 110 is provided with a function for generating signals to be transmitted to the user equipment 200, and for wirelessly transmitting the signals. The receiver 120 is provided with a function for receiving various types of signals transmitted from the user equipment 200, and for retrieving, for example, higher layer information from the received signals. Additionally, the transmitter 110 is provided with a function for transmitting, for example, NR-PSS, NR-SSS, NR-PBCH, NR-PDCCH, or NR-PDSCH to the user equipment 200. Additionally, transmitter 110 transmits various types of reference signals, such as DMRS and PTRS, to the user equipment 200.

The configuration information manager 130 stores configuration information that is configured in advance; and various types of configuration information items to be transmitted to the user equipment 200. Content of the configuration information is, for example, information related to an arrangement of a reference signal on a radio frame, etc.

The reference signal configuration 140 configures, in a radio frame, various types of reference signals to be transmitted from the base station apparatus 100 to the user equipment 200, such as DMRS and PTRS, which are described in the embodiments.

Figure 12:
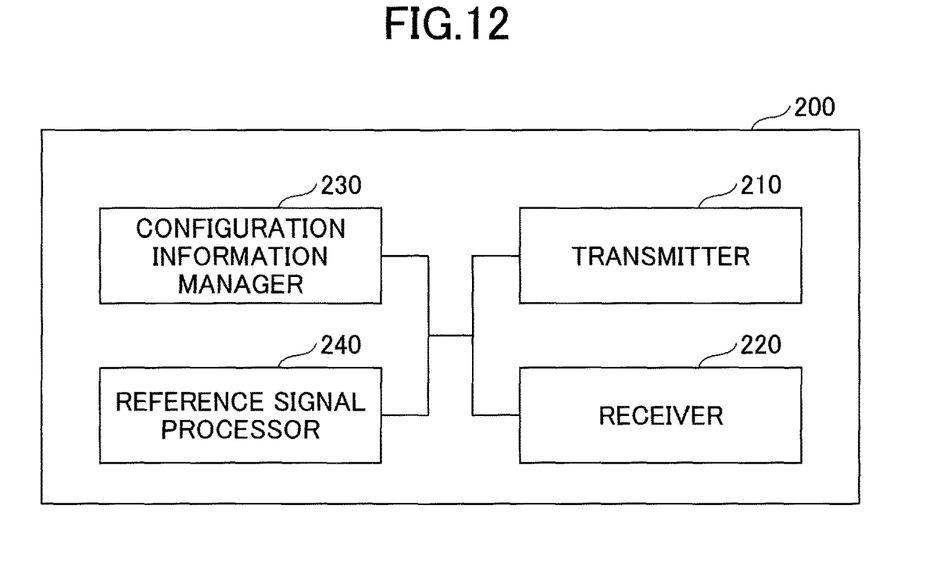
FIG. 12 is a diagram illustrating an example of a functional configuration of user equipment 200 according to an embodiment of the present invention.

FIG. 12 is a diagram illustrating an example of a functional configuration of the user equipment 200. As illustrated in FIG. 12, the user equipment 200 is provided with a transmitter 210; a receiver 220; a configuration information manager 230; and a reference signal processor 240. The functional configuration illustrated in FIG. 12 is merely an example. The functional division and the name of the functional unit may be any division and any name, provided that the operation according to the embodiment of the present invention can be executed.

The transmitter 210 generates a transmitting signal from transmitting data, and wirelessly transmits the transmitting signal. The receiver 220 wirelessly receives various types of signals, and retrieves higher layer signals from the received physical layer signals. Additionally, the receiver 220 is provided with a function for receiving, for example, NR-PSS, NR-SSS, NR-PBCH, NR-PDCCH, or NR-PDSCH transmitted from the base station apparatus 100. Additionally, the transmitter 210 transmits uplink signals to the base station apparatus 100, and the receiver 120 receives various types of reference signals, such as DMRS and PTRS, from the base station apparatus 100. The configuration information manager 230 stores various types of configuration information received by the receiver 220 from the base station apparatus 100. Additionally, the configuration information manager 230 stores configuration information that is configured in advance. The content of the configuration information is, for example, information related to an arrangement of a reference signal on a radio frame, etc.

The reference signal processor 240 executes control related to, for example, the operation in the user equipment 200 for receiving reference signals and using the reference signals for channel estimation and demodulation, which is described in the embodiments. Here, the functional unit for receiving the reference signals in the reference signal processor 240 may be included in the receiver 220.

(Hardware Configuration)

The functional configuration diagrams (FIG. 11 and FIG. 12) used in the description of the above-described embodiment of the present invention show blocks on a basis of functional units. These functional blocks (components) are implemented by a combination of hardware and/or software. In addition, means for implementing each functional block is not particularly limited. That is, each functional block may be implemented by one device in which a plurality of elements is physically and/or logically combined, or may be implemented by two or more devices by directly and/or indirectly connecting (e.g., through wire and/or wirelessly) the two or more devices that are physically and/or logically separated.

For example, the base station apparatus 100 and the user equipment 200 according to the embodiment of the present invention may function as computers for executing a process related to the embodiments of the present invention. FIG. 13 is a diagram illustrating an example of a hardware configuration a radio communication device, which can be the base station apparatus 100 or the user equipment 200 according to the embodiments of the present invention. Each of the above-described base station apparatus 100 and the user equipment 200 may be physically configured as a computer device including a processor 1001, a memory 1002, an auxiliary storage device 1003, a communication device 1004, an input device 1005, an output device 1006, a bus 1007, etc.

Note that, in the following description, the term "apparatus" can be read as a circuit, a device, a unit, etc. The hardware configuration of each of the base station apparatus 100 and the user equipment 200 may be configured to include one or more of the devices indicated by the reference numerals 1001 through 1006 shown in the figure, or may be configured not to include a part of the devices.

Each function of the base station apparatus 100 and the user equipment 200 is implemented by loading predetermined software (program) on hardware, such as the processor 1001 and the memory 1002, so that the processor 1001 performs computation and controls communication by the communication device 1004, and reading and/or writing of data in the memory 1002 and the auxiliary storage device 1003.

The processor 1001, for example, operates an operating system to control the entire computer. The processor 1001 may be configured with a central processing unit (CPU: Central Processing Unit) including an interface with a peripheral device, a control device, a processing device, a register, etc.

Additionally, the processor 1001 reads a program (program code), a software module, or data from the auxiliary storage device 1003 and/or the communication device 1004 to the storage device 1002, and executes various processes according to these. As the program, a program is used which causes a computer to execute at least a part of the operations described in the above-described embodiment. For example, the transmitter 110, the receiver 120, the configuration information manager 130, the reference signal configurator 140, which are illustrated in FIG. 11, may be implemented by a control program stored in the storage device 1002 and executed by the processor 1001. For example, the transmitter 210, the receiver 220, the configuration information manager 230, the reference signal processor 240 may be implemented by a control program stored in the storage device 1002 and executed by the processor 1001. Although it is described that the above-described various processes are executed by a single processor 1001, the above-described various processes may be simultaneously or sequentially executed by two or more processors 1001. The processor 1001 may be implemented by one or more chips. The program may be transmitted from a network via an electric communication line.

The storage device 1002 is a computer readable recording medium, and the storage device 1002 may be formed of at least one of a read-only memory (ROM), an erasable programmable ROM (EPROM), an electrically erasable programmable ROM (EEPROM), a random access memory (RAM), etc. The storage device 1002 may be referred to as a register, a cache, a main memory (main storage device), etc. The storage device 1002 can store executable programs (program codes), software modules, etc., that can be executed to implement the process according to the embodiment of the present invention.

The auxiliary storage device 1003 is a computer readable recording medium, and, for example, the auxiliary storage device 1003 may be formed of at least one of an optical disk such as a CD-ROM (Compact Disc ROM), a hard disk drive, a flexible disk, a magneto-optical disk (for example, a compact disk, a digital versatile disk, a Blu-ray (registered trademark) disk), a smart card, a flash memory (for example, a card, a stick, a key drive), a floppy (registered trademark) disk, a magnetic strip, etc. The auxiliary storage device 1003 may be referred to as an auxiliary storage device. The above-described storage medium may be, for example, a database, a server, or any other suitable medium including the storage device 1002 and/or the auxiliary storage device 1003.

The communication device 1004 is hardware (transmission/reception device) for performing communication between computers via a wired and/or wireless network, and, for example, the communication device 1004 is also referred to as a network device, a network controller, a network card, a communication module, etc. For example, the transmitter 110 and the receiver 120 of the base station apparatus 100 may be implemented by the communication device 1004. Furthermore, the transmitter 210 and the receiver 220 of the user equipment 200 may be implemented by the communication device 1004.

The input device 1005 is an input device (e.g., a keyboard, a mouse, a microphone, a switch, a button, a sensor, etc.) for receiving an input from outside. The output device 1006 is an output device (e.g., display, speaker, LED lamp, etc.) that performs output toward outside. Note that the input device 1005 and the output device 1006 may be integrated (for example, a touch panel).

Furthermore, the devices, such as the processor 1001 and the memory 1002, are connected by a bus 1007 for communicating information. The bus 1007 may be formed of a single bus, or the bus 1007 may be formed of buses that are different amount the devices.

Furthermore, each of the base station apparatus 100 and the user equipment 200 may be configured to include hardware, such as a microprocessor, a digital signal processor (DSP: Digital Signal Processor), an ASIC (Application Specific Integrated Circuit), a PLD (Programmable Logic Device), an FPGA (Field Programmable Gate Array), etc., and a part or all of the functional blocks may be implemented by the hardware. For example, the processor 1001 may be implemented by at least one of these hardware components.

Conclusion of the Embodiment

As described above, according to the embodiments of the present invention, there is provided a base station apparatus for communicating with user equipment, the base station apparatus including a configurator that arranges a reference signal used for demodulation and a reference signal used for a phase correction in a radio frame; and a transmitter that transmits the radio frame to the user equipment, wherein, in the radio frame, one of the reference signal used for the phase correction and the reference signal used for the demodulation is arranged within a predetermined interval.

With the above-described configuration, in the radio communication system, by appropriately arranging the PTRS, the overhead of the reference signals can be reduced, and the accuracy for the correction of the phase noise can be enhanced.

When a reference signal used for a first phase correction is arranged in the radio frame, for a reference signal used for demodulation being arranged within the predetermined interval from a reference signal used for a second phase correction, the reference signal used for the second phase correction being a previously occurring phase correction reference signal, the reference signal used for the first phase correction may be punctured. With this configuration, overhead of a reference signal can be reduced.

The predetermined interval may be an interval obtained by adding a predetermined symbol number to an interval between the reference signals used for the phase correction, and the predetermined symbol number may be determined based on the interval between the reference signals used for the phase correction. With this configuration, intervals at which a PTRS and a DMRS are inserted become close to equal intervals, and the accuracy of the phase noise correction can be smoothed.

When a reference signal used for a first phase correction is arranged in the radio frame, for a reference signal used for demodulation being arranged within the predetermined interval from a reference signal used for a second phase correction, the reference signal used for the second phase correction being a previously occurring phase correction reference signal, a location of the reference signal used for the first phase correction in the radio frame may be shifted in a time domain. With this configuration, intervals at which a PTRS and a DMRS are inserted become close to equal intervals, and the accuracy of the phase noise correction can be smoothed.

When the location of the reference signal used for the first phase correction in the radio frame is shifted in the time domain, the predetermined interval may be provided using, as a start point, the reference signal used for the demodulation arranged within the predetermined interval from the reference signal used for the second phase correction. With this configuration, intervals at which a PTRS and a DMRS are inserted become close to equal intervals, and the accuracy of the phase noise correction can be smoothed.

Furthermore, according to the embodiments of the present invention, there is provided user equipment for communicating with a base station apparatus, the user equipment including a receiver that receives a radio frame from the base station apparatus; and a processor that retrieves a reference signal used for demodulation and a reference signal used for a phase correction from the radio frame to execute the demodulation and the phase correction, wherein, in the radio frame, one of the reference signal used for the phase correction and the reference signal used for the demodulation is obtained within a predetermined interval.

With the above-described configuration, in the radio communication system, by appropriately arranging the PTRS, the overhead of the reference signal can be reduced, and the accuracy for the correction of the phase noise can be enhanced.

Supplemental Embodiments

The embodiments of the present invention are described above. However, the disclosed invention is not limited to the embodiments, and a person ordinarily skilled in the art will appreciated various alterations, modifications, substitutions, replacements, etc. In order to facilitate understanding of the invention, the descriptions are made using specific numerical examples. However, the numerical values are merely examples, and any suitable value may be used, unless as otherwise specified. The classification of the items in the descriptions above is not essential to the present invention, and matters described in two or more items may be combined depending on necessity, or a matter described in an item may be applied to a matter described in another item (provided that they do not contradict). The boundary of the functional unit or the processing unit in the functional block diagram does not necessarily correspond to the physical component boundary. Operations of the plurality of functional units may be implemented physically by one component, or an operation of one functional unit may be physically implemented by a plurality of components. The order of the procedures described in the embodiment may be changed, provided that there is no contradiction. For convenience of the description of the process, the base station apparatus 100 and the user equipment 200 are described using the functional block diagrams. However, these devices may be implemented by hardware, software, or a combination thereof. Each of the software that is operated by the processor of the base station apparatus 100 in accordance with the embodiments of the present invention and the software that is operated by the processor of the user equipment 200 in accordance with the embodiments of the present invention may be stored in a random access memory (RAM), a flash memory, a read-only memory (ROM), EPROM, EEPROM, a register, a hard disk (HDD), a removable disk, a CD-ROM, a database, a server, or any other appropriate storage medium.

Notification of information is not limited the aspects/embodiments described in the present specification, and may be performed by other methods. For example, notification of information may be performed via physical layer signaling (for example, Downlink Control Information (DCI) or Uplink Control Information (UCI)), higher-layer signaling (for example, RRC signaling, MAC signaling, broadcast information (Master Information Block (MIB), or System Information Block (SIB)), other signals, or by a combination thereof. Moreover, an RRC message may be referred to as the RRC signaling. Furthermore, the RRC message may be an RRC connection setup (RRC Connection Setup) message, a RRC connection reconfiguration (RRC Connection Reconfiguration) message, or the like, for example.

Each aspect/embodiment described in this specification can be applied to long term evolution (LTE), LTE-advanced (LTE-A), SUPER 3G, IMT-Advanced, 4G, 5G, future radio access (FRA), W-CDMA (registered trademark), GSM (registered trademark), CDMA2000, ultra mobile broadband (UMB), IEEE 802.11 (Wi-Fi), IEEE 802.16 (WiMAX), IEEE 802.20, ultra-wideband (UWB), Bluetooth (registered trademark), any other systems using an appropriate system and/or next generation systems expanded on the basis of these systems.

The order of the procedures, sequences, flowcharts, etc., of each aspect/embodiment described in the specification may be changed, provided that there is no contradiction. For example, for the methods described in the specification, the elements of the various steps are presented in an exemplary order, and the methods are not limited to the specific order presented.

The specific operations that are described in the present invention to be performed by the base station apparatus 100 may be performed by their upper nodes in some cases. In a network formed of one or more network nodes including the base station apparatus 100, it is apparent that the various operations performed for communication with the user equipment 200 may be performed by the base station apparatus 100 and/or a network node other than the base station apparatus 100 (e.g., MME or S-GW can be considered, however, not limited to these). In the above description, a case is exemplified in which there is one network node other than the base station apparatus 100. However, it can be a combination of other network nodes (e.g., MME and S-GW).

Each aspect/embodiment described in this specification may be used alone, may be used in combination, or may be used while being switched during the execution.

The user equipment 200 may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber stations, an access terminal, a mobile terminal, a wireless terminal, a remote terminal, a handset, a user agent, a mobile client, a client, or the user equipment 200 may be called by some other suitable terms.

The base station apparatus 100 may be referred to, by a person ordinarily skilled in the art, as a NodeB (NB), an enhanced NodeB (eNB), a gNB, a base station (Base Station), or the base station apparatus may be called by some other suitable terms.

The terms "determine (determining)" and "decide (determining)" used in this specification may include various types of operations. For example, "determining" and "deciding" may include deeming that a result of calculating, computing, processing, deriving, investigating, looking up (e.g., search in a table, a database, or another data structure), or ascertaining is determined or decided. Furthermore, "determining" and "deciding" may include, for example, deeming that a result of receiving (e.g., reception of information), transmitting (e.g., transmission of information), input, output, or accessing (e.g., accessing data in memory) is determined or decided. Furthermore, "determining" and "deciding" may include deeming that a result of resolving, selecting, choosing, establishing, or comparing is determined or decided. Namely, "determining" and "deciding" may include deeming that some operation is determined or decided.

The expression "on the basis of" used in the present specification does not mean "on the basis of only" unless otherwise stated particularly. In other words, the expression "on the basis of" means both "on the basis of only" and "on the basis of at least."

As long as "include," "including," and variations thereof are used in this specification or the claims, the terms are intended to be inclusive in a manner similar to the term "comprising." Furthermore, the term "or" used in the specification or claims is intended to be not an exclusive OR.

In the entire disclosure, for example, if an article, such as a, an, and the, is added by translation, the article may include a plurality of elements, unless as indicated otherwise by the context.

In the embodiments of the present invention, the DMRS is an example of a reference signal used for demodulation. The PTRS is an example of a reference signal used for a correction of a phase. The reference signal configurator 140 is an example of a configurator. A resource specified by a symbol and a subcarrier is an example of the resource. A set of resources defined by one slot or fourteen symbols and twelve subcarriers is an example of a radio frame. The reference signal processor 240 is an example of a processor. The number of N+X symbols or the number of N symbols is an example of a predetermined interval. The number of N symbols is an example of an interval between reference signals used for phase correction. The number of X symbols.

The present invention is described in detail above. It is apparent to a person ordinarily skilled in the art that the present invention is not limited to the embodiments described in the specification. The present invention can be implemented as a modified and altered embodiment without departing from the gist and the scope of the present invention, which are defined by the description of the claims. Accordingly, the description of the present invention is for the purpose of illustration and does not have any restrictive meaning to the present invention.

LIST OF REFERENCE SYMBOLS

100 base station apparatus
200 user equipment
110 transmitter
120 receiver
130 configuration information manager
140 reference signal configurator
200 user equipment
210 transmitter
220 receiver
230 configuration information manager
240 reference signal processor
1001 processor
1002 storage device
1003 auxiliary storage device
1004 communication device
1005 input device
1006 output device

The invention claimed is:
1. A terminal comprising:
a processor that arranges a demodulation reference signal (DMRS) in a first resource, and arranges a phase tracking reference signal (PTRS) in an interval of a number of symbols in a second resource with a symbol of the DMRS as a starting point, and
a transmitter that transmits, to a base station apparatus, the DMRS and the PTRS that are arranged in the first resource and the second resource, respectively,
wherein, when the processor arranges the PTRS in the interval of the number of symbols with a symbol of a first DMRS as a starting point, and when the processor arranges a second DMRS within the interval of the number of symbols of the PTRS, the processor arranges a further PTRS in the interval of the number of symbols in the second resource with a symbol of the second DMRS as a starting point.

2. The terminal according to claim 1,
wherein, when the processor arranges the DMRS in two consecutive symbols, the processor arranges the PTRS in the interval of the number of symbols in the second resource with the second symbol of the DMRS as a starting point.

3. A terminal comprising:
a receiver that receives a demodulation reference signal (DMRS) in a first resource transmitted from a base station apparatus, and receives, based on information indicating mapping of a phase tracking reference signal (PTRS) reported from the base station apparatus, the PTRS in an interval of a number of symbols in a second resource with a symbol of the DMRS as a starting point; and a processor that performs demodulation based on the DMRS, and performs phase tracking based on the PTRS, wherein, when the PTRS is arranged in the interval of the number of symbols with a symbol of a first DMRS as a starting point, and when a second DMRS is arranged within the interval of the number of symbols of the PTRS, the receiver receives a further PTRS in the interval of the number of symbols in the second resource with a symbol of the second DMRS as a starting point.

4. The terminal according to claim 3, wherein, when the DMRS is arranged in two consecutive symbols, the receiver receives the PTRS in the interval of the number of symbols in the second resource with the second symbol of the DMRS as a starting point.

5. A base station apparatus comprising:

a processor that arranges a demodulation reference signal (DMRS) in a first resource, and arranges a phase tracking reference signal (PTRS) in an interval of a number of symbols in a second resource with a symbol of the DMRS as a starting point; and a transmitter that transmits, to a terminal, the DMRS and the PTRS that are arranged in the first resource and the second resource, respectively, wherein, when the processor arranges the PTRS in the interval of the number of symbols with a symbol of a first DMRS as a starting point, and when the processor arranges a second DMRS within the interval of the number of symbols of the PTRS, the processor arranges a further PTRS in the interval of the number of symbols in the second resource with a symbol of the second DMRS as a starting point.

6. A radio communication system comprising:

a terminal; and a base station apparatus, wherein the terminal includes:

a processor that arranges a demodulation reference signal (DMRS) in a first resource, and arranges a phase tracking reference signal (PTRS) in an interval of a number of symbols in a second resource with a symbol of the DMRS as a starting point, and a transmitter that transmits, to the base station apparatus, the DMRS and the PTRS that are arranged in the first resource and the second resource, respectively, wherein, when the processor arranges the PTRS in the interval of the number of symbols with a symbol of a first DMRS as a starting point, and when the processor arranges a second DMRS within the interval of the number of symbols of the PTRS, the processor arranges a further PTRS in the interval of the number of symbols in the second resource with a symbol of the second DMRS as a starting point, and wherein the base station apparatus includes a receiver that receives the DMRS and the PTRS.

7. A radio communication system comprising:

a base station apparatus; and a terminal, wherein the base station apparatus includes:

a first processor that arranges a demodulation reference signal (DMRS) in a first resource, and arranges a phase tracking reference signal (PTRS) in an interval of a number of symbols in a second resource with a symbol of the DMRS as a starting point; and a transmitter that transmits, to the terminal, the DMRS and the PTRS that are arranged in the first resource and the second resource, respectively, wherein, when the first processor arranges the PTRS in the interval of the number of symbols with a symbol of a first DMRS as a starting point, and when the first processor arranges a second DMRS within the interval of the number of symbols of the PTRS, the first processor arranges a further PTRS in the interval of the number of symbols in the second resource with a symbol of the second DMRS as a starting point, and wherein the terminal includes:

a receiver that receives the DMRS in the first resource transmitted from the base station apparatus, and receives, based on information indicating mapping of the PTRS reported from the base station apparatus, the PTRS in the interval of the number of symbols in the second resource with the symbol of the DMRS as the starting point; and a second processor that performs demodulation based on the DMRS, and performs phase tracking based on the PTRS.

8. A method by a terminal, the method comprising:

arranging a demodulation reference signal (DMRS) in a first resource, and arranging a phase tracking reference signal (PTRS) in an interval of a number of symbols in a second resource with a symbol of the DMRS as a starting point, and transmitting, to a base station apparatus, the DMRS and the PTRS that are arranged in the first resource and the second resource, respectively, wherein, when the arranging arranges the PTRS in the interval of the number of symbols with a symbol of a first DMRS as a starting point, and when the arranging arranges a second DMRS within the interval of the number of symbols of the PTRS, the arranging arranges a further PTRS in the interval of the number of symbols in the second resource with a symbol of the second DMRS as a starting point.

9. A method by a terminal, the method comprising:

receiving a demodulation reference signal (DMRS) in a first resource transmitted from a base station apparatus, and receiving, based on information indicating mapping of a phase tracking reference signal (PTRS) reported from the base station apparatus, the PTRS in an interval of a number of symbols in a second resource with a symbol of the DMRS as a starting point; and performing demodulation based on the DMRS, and performing phase tracking based on the PTRS, wherein, when the PTRS is arranged in the interval of the number of symbols with a symbol of a first DMRS as a starting point, and when a second DMRS is arranged within the interval of the number of symbols of the PTRS, the receiving receives a further PTRS in the interval of the number of symbols in the second resource with a symbol of the second DMRS as a starting point.

10. A method by a base station apparatus, the method comprising:

arranging a demodulation reference signal (DMRS) in a first resource, and arranging a phase tracking reference signal (PTRS) in an interval of a number of symbols in a second resource with a symbol of the DMRS as a starting point; and transmitting, to a terminal, the DMRS and the PTRS that are arranged in the first resource and the second resource, respectively, wherein, when the arranging arranges the PTRS in the interval of the number of symbols with a symbol of a first DMRS as a starting point, and when the arranging arranges a second DMRS within the interval of the number of symbols of the PTRS, the arranging arranges a further PTRS in the interval of the number of symbols in the second resource with a symbol of the second DMRS as a starting point.

* * * * *